United States Patent [19]

Cheng

[11] 4,133,134

[45] Jan. 9, 1979

[54] FISHING LURE

[76] Inventor: Fred F. Cheng, 23027 Enadia Way, Canoga Park, Calif. 91307

[21] Appl. No.: 805,890

[22] Filed: Jun. 13, 1977

[51] Int. Cl.$^2$ .......................................... A01K 85/00
[52] U.S. Cl. .................................................. 43/42.06
[58] Field of Search ................. 43/42.06, 42.05, 42.12, 43/42.36, 41

[56] References Cited

U.S. PATENT DOCUMENTS 3,991,504  11/1976  Pieper ................................. 43/42.06

FOREIGN PATENT DOCUMENTS 646955  8/1962  Canada ..................................... 43/42.06

Primary Examiner—Robert C. Watson
Attorney, Agent, or Firm—Wells, St. John & Roberts

[57] ABSTRACT

A fishing lure comprising an elongated hollow tube which holds a supply of water-soluble scented bait for attracting fish. The tube is rotatably mounted about an elongated coaxial spinner shaft which protrudes outward from both ends of the tube. The tube is free to rotate relative to the shaft. Axial flow of water is achieved through the tube for release of soluble bait material while fishing.

2 Claims, 7 Drawing Figures

FISHING LURE

BACKGROUND OF THE INVENTION

Research studies show that olfactory perception plays an indispensable role in the procurement of foods by fish. The importance of odor in the food-searching behavior of fish has been demonstrated in numerous scholarly observations.

The fishing lure described herein is an artificial fish tackle which has the ability to release minute amounts of scent of natural forages into the water. It incorporates the characteristics and advantages of live-bait and artificial tackle fishing. It is an improvement over live-bait fishing in that almost all types of natural forages can be used as bait-scent regardless of their size. It also holds bait more securely than is possible with a conventional hook. At the same time, it spreads the bait-scent through the surrounding water at a faster rate and through a longer distance than is possible with a baited hook. It is better than conventional artificial fishing tackles in that it resembles natural prey organisms more vividly by possessing their characteristic scents. By combining conventional live bait and artificial tackle fishing techniques into one unit, the lure is able to incorporate two groups of target fishes together and thus improve the resulting angling efficiency.

The prior patent to Duller, U.S. Pat. No. 3,066,434 discloses a lure including a capsule having holes at one end to permit entry of water to a fish attracting substance. The opposite end of the capsule can be pierced by a hook. The capsule is mounted alongside the normal elongated shank of the hook.

The prior patent to Littlefield, U.S. Pat. No. 3,434,230 shows a flexible lure having a cavity for reception of bait and perforations about the sides of the lure to facilitate release of the bait scent into the water. An elongated shank extends through the lure, but not through the bait cavity.

A general purpose capsule or tube for holding soluble bait in a fishing lure is disclosed in U.S. Pat. 3,969,840 to Charron. The capsule is shown together with various hook combinations. It is closed at both ends, having perforations about its side walls for release of the scent.

SUMMARY OF THE INVENTION

The fishing lure described herein basically comprises a hollow tube for receiving water soluble scented bait, the tube having first and second axial ends. An elongated spinner shaft extends coaxially through the tube and protrudes outwardly from both its ends. Means are provided at the ends of the tube for rotatably mounting the tube relative to the shaft and for permitting axial flow of water through the tube. These elements are described and claimed with respect to various alternatives.

A first object of the invention is to provide a relatively simple structure which can be constructed and used with economy. This is of particular importance with respect to spinner lures which are subject to loss while fishing.

Another object of the invention is to provide a fishing lure for receiving and discharging scented bait materials with a bait cavity which can be readily loaded or unloaded while fishing. Handling of the various components of the lure is facilitated by the fact that they are all coaxially mounted along a common spinner shaft. This prevents any one element from being misplaced or lost while the lure is partially disassembled.

Another object of the invention is to provide a fishing lure which efficiently distributes and spreads scented bait materials while being used in a manner conventional for trolling, spin fishing, bait fishing and other conventional tackle techniques.

These and further objects will be evident from the following disclosure and the accompanying drawings which illustrate a basic embodiment of the invention as well as several alternative arrangements.

DESCRIPTION OF THE PREFERRED EMBODIMENTS

This disclosure is concerned with release of scented bait while fishing in a conventional manner using normal tackle techniques. By "scented bait" is meant any substance which is at least partially water soluble and which releases a scent attractive to fish. It can be made from natural fish foods and can be mixed with other materials to preserve its quality, to provide it with suitable flow characteristics, or to control its release rate in water. The scented bait can be preserved by freezing, by freeze drying or other suitable preservation processes. It can be in solid or liquid form. It is preferably prepared so as to release in water over a reasonable time period while in use.

Figure 1:
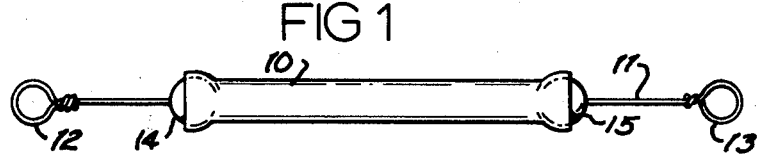
FIG. 1 is a plan view of the basic fishing lure.
Figure 2:
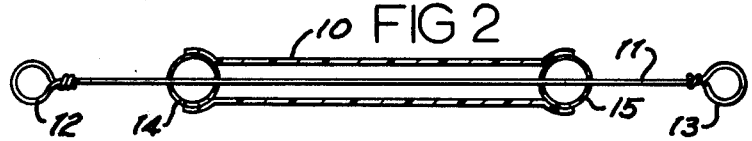
FIG. 2 is an axial section taken through the lure in FIG. 1.

The basic elements of the lure improvement are shown in FIGS. 1 and 2. These include a hollow tube 10 which is elongated in the axial direction. The hollow interior of tube 10 is adapted to receive a supply of scented bait. The tube has first and second axial ends. In the illustrated embodiment the tube comprises a length of conventional plastic tubing. It could be constructed from any suitable resilient material such as rubber or plastic resins. It can be transparent, translucent or opaque. The length of tubing is preferably cut at each end in a plane perpendicular to its longitudinal central axis. Conventional tubing of this type has an annular interior diameter and a coaxial exterior diameter, both centered about a longitudinal axis to present a continuous cylindrical wall.

An elongated spinner shaft is shown at 11. It extends coaxially through the length of tube 10 and protrudes outwardly from both its ends. It is illustrated as comprising a length of stiff metal wire having closed loops 12, 13 bent or otherwise formed at each of its respective ends.

The shaft 11 is guided within tube 10 by a pair of identical plugs 14, 15. Each plug is frictionally mounted at one of the respective ends of tube 10 for rotatably supporting tube 10 relative to shaft 11. The apertures through the plugs 14, 15 which receive shaft 11, are preferably larger in diameter than the diameter of the wire. This allows plugs 14, 15 to loosely receive the shaft 11 and permits axial flow of water between shaft 11 and the surrounding plug surfaces through these loose-fitting apertures. In the specific embodiment shown, each plug 14, 15 comprises a hollow spherical ball formed of metal and having an axial opening formed therethrough. The exterior diameter of the balls is slightly greater than the relaxed inner diameter of the resilient tubing utilized in the formation of tube 10.

The lure body compartment may also be made from a small plastic tube with narrow diameter. In this case, omission of plugs will not seriously impair the movement of the lure.

In use, one or both plugs, 14, 15 can be removed from within tube 10 to permit access to the interior of the tubing for filling the interior with scented bait. The plugs 14, 15 are then frictionally engaged within the ends of the tube 10 and will remain in place until manually removed. The tube 10 and plugs 14, 15 freely rotate about the spinner shaft 11 and therefore do not detract from rotational or other movement that might be imparted to attached lures or hooks. All pulling or tensile forces in the fishing tackle are transmitted through the tube 10 by the direct connection of the uninterrupted shaft 11. Tube 10 does not interfere with the normal strength of the supporting line or tackle. As the tackle is moved through the water, water will continuously flow through the interior of tube 10 and will slowly dissolve the scented bait, which then is released through the downstream end of tube 10 at a radial location adjacent shaft 11. In this manner, the scent is released directly in line with the trailing lures or hooks.

One advantage of this structure is that the bait compartment within tube 10 is mounted coaxially about the elongated supporting shaft 11. The surrounding tube 10 and plugs 14, 15 cannot be accidently displaced or lost, since they are not removed from the connecting shaft 11. The enlarged loops 12, 13 prevent the lure components from being individually lost or misplaced while refilling or modifying the tackle.

The above basic structure is exceptionally simple in construction. It can be readily fabricated from conventional materials available readily and at an inexpensive cost. No special molding or fabrication of these elements is required. The bait compartment formed within the interior of tube 10 is very easy to refill, and no special tools are required. Since the tubing is resilient, the plugs 14, 15 can be readily displaced by slightly pinching the tube 10 inwardly adjacent the plugs 14, 15 to pry the plugs axially along the length of shaft 11. Furthermore, since the plugs 14, 15 can be completely removed from both ends of tube 10, the full interior of tube 10 can be readily opened and washed by flushing water or other liquid through tube 10.

Figure 3:
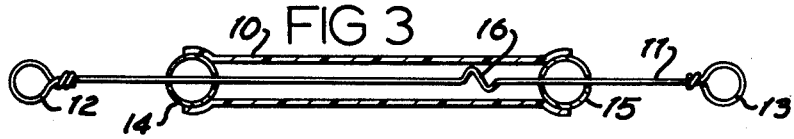
FIG. 3 is a section view similar to FIG. 2, showing a shaft modification.

FIG. 3 shows a modification of the basic elements in the invention. The portion of shaft 11 intermediate the ends of tube 10 are bent at 16 to provide deviations from the straight coaxial wire configuration. The bends 16, which are free to rotate independent of tube 10, assist in agitating and mixing the water and scented bait within tube 10. They also assist in removing entrapped air bubbles which might otherwise remain within tube 10 during use of the device. Shaft 11 can be bent sharply (as illustrated) or can be smoothly curved intermediate the ends of tube 10. In any case, it will be allowed to rotate outwardly from the normal coaxial wire position and the common shaft axes through the plugs 14, 15.

Figure 4:
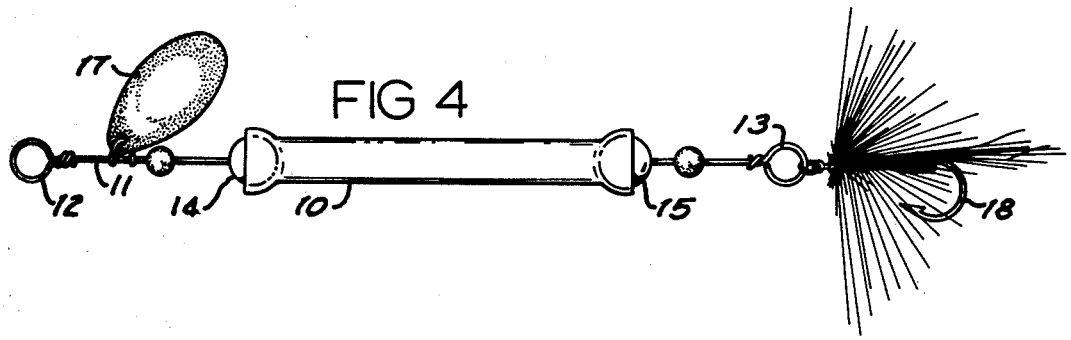
FIG. 4 is a plan view of the basic lure with an attached spinner blade and hook.

FIG. 4 illustrates the device in conjunction with a conventional spinner blade 17 rotatably mounted on shaft 11 upstream from tube 10, together with a conventional feathered hook 18 attached to the downstream loop 13. When arranged in this manner, the baited scent compartment within tube 10 becomes an integral part of the resulting spinning or trolling lure combination. The cylindrical nature of tube 10 minimizes water resistance and disturbance, and does not affect the physical attraction attributable to the tackle.

Figure 5:
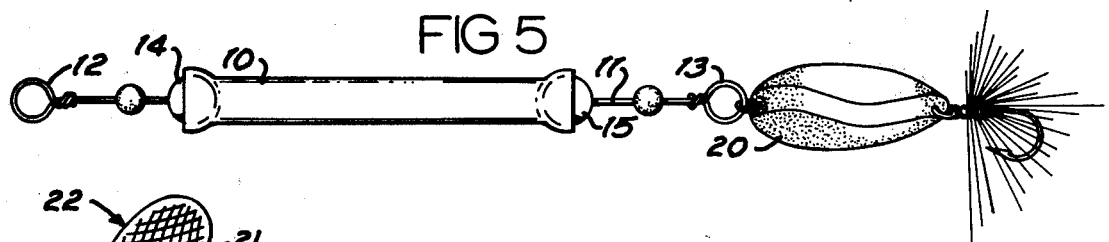
FIG. 5 is a plan view of the basic lure and an attached spinner lure.

FIG. 5 illustrates a combination of the apparatus in FIGS. 1 and 2, together with a conventional spinner lure or spoon indicated generally at 20. Again, it is to be emphasized that the location of tube 10 will release the scented bait coaxially along shaft 11 in a downstream direction, enabling the scent to be concentrated about the physically attractive lure 20.

Figure 6:
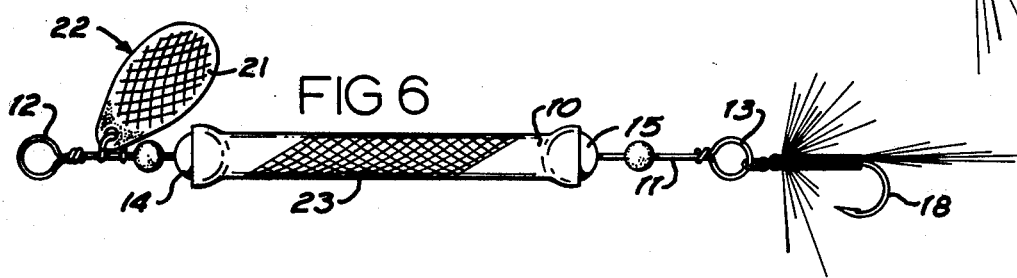
FIG. 6 is a plan view of a modified lure.

FIG. 6 shows a trolling or spinning combination similar to that in FIG. 4, illustrating the use of an external scented surface in addition to the scented bait contained within the interior compartment formed by tube 10 and plugs 14, 15. As shown in FIG. 6, a surface 21 on the otherwise conventional spinner blade 22 has a flocked configuration. The flocked surface is very similar to that found on velvet materials. The flocked surface 21 provides adherence for an oil based scent, which is thereby exposed exteriorly to the water for slow dissolving action.

As shown in FIG. 6, the tube 10 also can have a surface that is flocked at 23. The advantage of providing an adhering surface on all or part of the exterior of the various lure components is to incorporate the use of oil based attractive scent materials as a complement to the water soluble or water based materials within tube 10. Oil based scent material can be more effectively released from the exterior surface of the lure body over a reasonable period of time.

Figure 7:
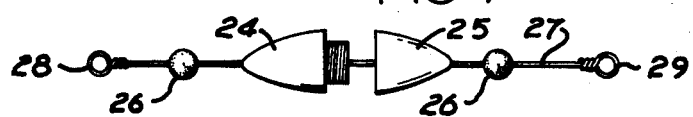
FIG. 7 is a plan view of an alternate embodiment of the lure.

FIG. 7 shows a modification of the basic elements, wherein the bait compartment is formed from a double ended tube having complementary threaded sections 24, 25. The outer ends of the respective sections 24, 25 are tapered to minimize water disturbance. The interiors of sections 24, 25 are hollow to receive scented bait material. The abutting portions of the sections 24, 25 are threaded so as to allow them to be releasably secured to one another, permitting access to the interior of the bait compartment for refilling and cleaning purposes. Spherical bearings 26 locate the elements 24, 25 along a supporting shaft 27, having end loops 28, 29 as previously described. This embodiment can be used in conjunction with conventional tackle in the same manner as discussed above, and its surfaces can be flocked as desired. The bearing apertures at the outer ends of elements 24, 25 loosely receive the shaft 27 to provide for relative rotation between shaft 27 and the elements 24, 25. These loose fitting connections also permit axial flow of water through the interior bait compartment from one end of the bait compartment to the other. Different forms of available mechanical interconnections can be provided between the releasable sections 24, 25 in place of the threaded connection illustrated.

The above device is believed to be unique in its simplicity, both as to use and construction. The angler needs only to connect the baited lure to a hook or any other type of conventional tackle by means of a swivel or snap ring. The removable plugs provide ready access to the interior of the bait compartment. They allow the angler to refill the device or to change the baited scent very rapidly, with no danger of any components being lost, since they are all strung along the common supporting shaft structure.

The baited lure presents a free-moving lure body along a spinner shaft and does not interfere with normal use of related conventional tackle equipment. The single spinner shaft extends through all components of the lure, including the baited lure cavity or compartment itself. During the course of spinning, scent materials are evenly mixed and agitated by the relative movement between the bait compartment and the spinner shaft to insure continuous release of the baited scent into the water adjacent the trailing hooks.

The use of flocked surfaces on the lures provides additional attraction. The flocked surface configuration forms large numbers of pockets which behave like small sponges and which provide adherence for vast quantities of oil based scented bait materials. The flocked surfaces function as a scent reserve and time the release of the scented bait material over a reasonable duration. In addition to its ability for holding large quantities of oil based scent materials for release over a fairly long duration, the fluffy appearance of the flocked surface also physically resembles real hair appendages of many aquatic organisms such as crayfish and aquatic insects. Flocked fishing lures also allow the angler to apply commercial or natural scent materials onto the lure by simply spraying or smearing the material without actually handling the scent material itself.

Many further modifications might be suggested from a review of the above description. For this reason, only the following claims are set out as definitions of the invention.

Having described my invention, I claim:

1. A fishing lure comprising:
   a hollow tube adapted to receive a supply of water-soluble scented bait, said tube having first and second axial ends;
   an elongated spinner shaft extending coaxially through said tube and protruding outward from both its first and second axial ends; and
   means at said first and second axial ends of the tube for rotatably mounting the tube relative to the shaft and for permitting axial flow of water through the tube;
   wherein at least a portion of the exterior surface of the tube is flocked for retention of scent materials applied thereto.

2. A fishing lure comprisng:
   a hollow tube adapted to receive a supply of water-soluble scented bait, said tube having first and second axial ends;
   an elongated spinner shaft extending coaxially through said tube and protruding outward from both its first and second axial ends; and
   means at said first and second axial ends of the tube for rotatably ounting the tube relative to the shaft and for permitting axial flow of water through the tube;
   wherein the shaft is bent intermediate the ends of the hollow tube.

* * * * *